United States Patent [19]

Takao et al.

[11] Patent Number: 5,101,289
[45] Date of Patent: Mar. 31, 1992

[54] CHIRAL SMECTIC COLOR DISPLAY DEVICE WITH INTERVAL BETWEEN COLOR FILTERS: COLOR FILTER FILM THICKNESS RATIO OF 0-5

[75] Inventors: Hideaki Takao, Sagamihara; Tatsuo Murata, Atsugi; Junichiro Kanbe; Miki Tamura, both of Yokohama; Masaru Kamio, Atsugi; Nobuyuki Sekimura, Kawasaki; Yoshiki Kikuchi, Sagamihara, all of Japan

[73] Assignee: Canon Kabushiki Kaisha, Tokyo, Japan

[21] Appl. No.: 416,034

[22] Filed: Oct. 2, 1989

Related U.S. Application Data

[62] Division of Ser. No. 90,703, Aug. 28, 1987, Pat. No. 4,917,471.

[30] Foreign Application Priority Data

| Aug. 30, 1986 | [JP] | Japan | 61-202746 |
|---|---|---|---|
| Aug. 30, 1986 | [JP] | Japan | 61-202747 |
| Aug. 30, 1986 | [JP] | Japan | 61-202748 |
| Aug. 30, 1986 | [JP] | Japan | 61-202749 |
| Nov. 20, 1986 | [JP] | Japan | 61-275352 |
| Jan. 23, 1987 | [JP] | Japan | 62-014923 |

[51] Int. Cl.$^5$ .................................................. G02F 1/133
[52] U.S. Cl. ........................................ 359/68; 359/100
[58] Field of Search ...... 350/339 F, 333 US, 341 US, 350/343 US, 344 US, 350 SUS

[56] References Cited

U.S. PATENT DOCUMENTS

| 4,597,637 | 7/1986 | Ohta | 350/339 F |
|---|---|---|---|
| 4,601,546 | 7/1986 | Ohta | 350/339 F |
| 4,653,862 | 3/1987 | Morozumi | 350/339 F |
| 4,690,511 | 9/1987 | Watanabe | 350/339 F |
| 4,712,874 | 12/1987 | Sekimura et al. | 350/339 F |
| 4,779,957 | 10/1988 | Suginoya et al. | 350/339 R |
| 4,802,743 | 2/1989 | Takao et al. | 350/339 F |
| 4,813,767 | 3/1989 | Clark et al. | 350/341 |

FOREIGN PATENT DOCUMENTS

| 55-06342 | 1/1980 | Japan . |
|---|---|---|
| 60-247603 | 12/1985 | Japan . |
| 61-45226 | 3/1986 | Japan . |

Primary Examiner—Stanley D. Miller
Assistant Examiner—Ron Trice
Attorney, Agent, or Firm—Fitzpatrick, Cella, Harper & Scinto

[57] ABSTRACT

A chiral smectic liquid crystal color display device has plural non-overlapping color filters arranged at intervals such that $0 \leq l/d \leq 5$ wherein $l$ ($\mu$m) is the interval between color filters and $d$ ($\mu$m) is the color filter film thickness.

10 Claims, 10 Drawing Sheets

CHIRAL SMECTIC COLOR DISPLAY DEVICE WITH INTERVAL BETWEEN COLOR FILTERS: COLOR FILTER FILM THICKNESS RATIO OF 0-5

This application is a division of application Ser. No. 090,703, filed Aug. 28, 1987 now U.S. Pat. No. 4,917,471.

BACKGROUND OF THE INVENTION

1. Field of the Invention

This invention relates to a ferroelectric liquid crystal device such as a liquid crystal display device or a liquid crystal-optical shutter array, etc., more particularly to a ferroelectric liquid crystal device having a color filter improved in display and driving characteristics by obtaining a liquid crystal phase of uniform mono-domain without alignment defect through improvement of the initial alignment state of liquid crystal molecules.

2. Related Background Art

Liquid crystal devices known in the art may be, for example, those using twisted nematic crystal as disclosed in M. Schadt and W. Helfrich, "Applied Physics Letters", vol. 18, No. 4 (published on Feb. 15, 1971), p. 127–128, "Voltage Dependent Optical Activity of a Twisted Nematic Liquid Crystal". The TN liquid crystal, which involves the problem of generating crosstalk during time divisional driving by use of a matrix electrode structure with increased picture element density, has been limited in number of picture elements.

Also, a display device of the system in which switching elements with thin film transistors are connected with the respective picture elements and each picture element is subjected to switching has been known, but the step of forming thin film transistors on a substrate is extremely complicated and furthermore there is the problem that a display device with a large area can be prepared with difficulty.

As the device solving these problems, Clark et al. proposed a ferroelectric liquid crystal device in U.S. Pat. No. 4,367,924.

This ferroelectric liquid crystal device is generally called Surface Stability Ferroelectric Liquid Crystal (SSFCC), and is set at a sufficiently thin film thickness (e.g., 1 to 2 $\mu$m) in order to unwind the spiral structure inherently possessed by the chiral smectic liquid crystal. According to Unexamined Japanese Patent Publication No. 147232/1986 of Tsuboyama, it has been clarified that when there is a stepped difference of 1000 Å or more within the substrate plane used in the cell forming SSFLC, an alignment defect portion will be generated around a stepped portion.

Whereas, for applying the aforementioned ferroelectric liquid crystal device to color display, it may be conceivable to arrange a color filter within the cell.

In general, a color filter is a structure of a group of color filter units (each being one R, G or B filter) of red color (R), green color (G) and blue color (B) arranged in a stripe or mosaic shape. Since each color filter unit is formed of a resin film colored into R, G or B, there occurred a stepped difference of about 2000 Å to 1 $\mu$m within the substrate plane when such color filters were arranged within the cell.

SUMMARY OF THE INVENTION

An object of the present invention is to provide a liquid crystal device improved in generation of the alignment defect which is attributable to the stepped difference within the substrate plane caused by arrangement of color filters within the cell.

More specifically, the present invention has the specific features in a liquid crystal device which has minimized the influence onto alignment stability of the ferroelectric liquid crystal by the stepped difference caused by arrangement of color filters within the cell, namely:

firstly in a liquid crystal device comprising:
(a) a pair of transparent electrodes having a plurality of confronting portions formed therebetween;
(b) a pair of substrates supporting each of said pair of transparent electrodes;
(c) a group of color filters comprising a plurality of color filters arranged on the innerside of at least one of the above pair of substrates and arranged at positions corresponding to each of said plurality of confronting portions, provided that the relationship of $0 \leq a \leq 5$ is satisfied where a($\mu$m) is the interval of the color filter between the adjacent confronting portions; and
(d) a ferroelectric liquid crystal arranged between said pair of substrates;

secondly in a liquid crystal device comprising:
(a) a pair of transparent electrodes having a plurality of confronting portions formed therebetween;
(b) a pair of substrates supporting each of said pair of transparent electrodes;
(c) a group of color filters comprising a plurality of color filters arranged on the innerside of at least one of the above pair of substrates and arranged at positions corresponding to each of said plurality of confronting portions, provided that the color filters positioned at at least two confronting portions of the plural confronting portions are different in film thickness and the relationship of $X \leq (1/10) \cdot d_0$ is satisfied where $d_0$ is the interval ($\mu$m) between the above pair of substrates and X($\mu$m) is the maximum film thickness difference; and
(d) a ferroelectric liquid crystal arranged between said pair of substrates;

thirdly in a liquid crystal device comprising:
(a) a pair of transparent electrodes having a confronting portion formed therebetween;
(b) a pair of substrates supporting each of said pair of transparent electrodes;
(c) color filters arranged on the innerside of at least one of the above pair of substrates and arranged at positions corresponding to said confronting portion;
(d) resin films arranged adjacent to said color filters, the resin films having a first resin film and a second resin film formed with a resin solution having a viscosity higher than the resin solution used when said first resin film is formed; and
(e) a ferroelectric liquid crystal arranged between said pair of substrates;

fourthly in a liquid crystal device comprising:
(a) a pair of transparent electrodes forming a plurality of confronting portions;
(b) a pair of substrates supporting each of said pair of transparent electrodes;
(c) a group of color filters comprising a plurality of color filters arranged on the innerside of at least one of the above pair of substrates and arranged at positions corresponding to each of said plurality of confronting portions, said color filters being formed in trapezoidal shapes, provided that the relationships of $0° < \theta < 90°$ and $0 < W \leq d/\tan\theta$ are satisfied where d($\mu$m) is the thickness of said color filter, $\theta$(degree) is the sectional taper angle between the lower bottom of the color filter and the diagonal side thereof and W(μm) is the overlapping width between the adjacent color filters; and (d) a ferroelectric liquid crystal arranged between said pair of substrates;

fifthly in a liquid crystal device comprising:

(a) a pair of transparent electrodes forming a plurality of confronting portions;

(b) a pair of substrates supporting each of said pair of transparent electrodes;

(c) a group of color filters comprising a plurality of color filters arranged on the innerside of at least one of the above pair of substrates and arranged at positions corresponding to each of said plurality of confronting portions;

(d) a heat-fusible resin film arranged at the gap between the adjacent color filters; and (e) a ferroelectric liquid crystal arranged between said pair of substrates; and sixthly in a liquid crystal device comprising:

(a) a pair of transparent electrodes forming a plurality of confronting portions;

(b) a pair of substrates supporting each of said pair of transparent electrodes;

(c) a group of color filters comprising a plurality of color filters arranged on the innerside of at least one of the above pair of substrates and arranged at positions corresponding to each of said plurality of confronting portions, provided that the relationship of $0 \leq l/d \leq 5$ is satisfied where $l(\mu m)$ is the interval between the color filters of the adjacent confronting portions and $d(\mu m)$ is the film thickness of said color filter; and (d) a ferroelectric liquid crystal arranged between said pair of substrates.

DETAILED DESCRIPTION OF EMBODIMENTS

Figure 1:
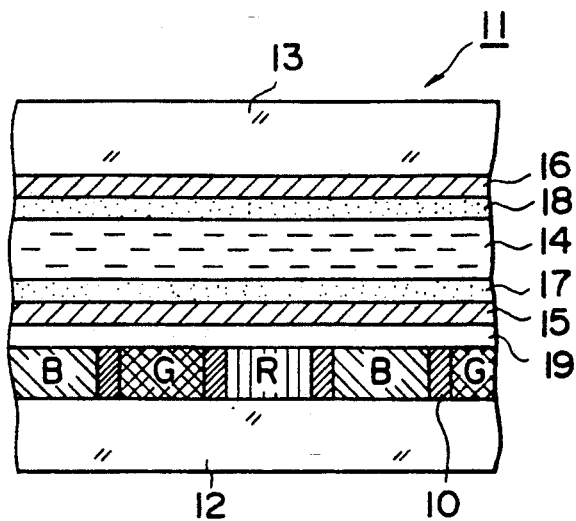
FIG. 1 through FIG. 6 are sectional views of the ferroelectric liquid crystal devices of the present invention.

The present inventors have found, as a result of experiments, that no alignment defect is generated by setting the interval $a(\mu m)$ between the filter units of the color filter built in the cell at 5 μm or less, regardless of the above stepped difference. Particularly, it has been found that by setting the interval $a(\mu m)$ between the filter units at 5 μm or less upon formation of the initial alignment state in the temperature drop process when the ferroelectric liquid crystal is transferred from the isotropic phase (high temperature state) to the liquid crystal phase (low temperature state), no alignment defect is generated.

Referring to the drawings, the present invention is explained below.

FIG. 1 is a sectional view showing the basic constitution of the ferroelectric liquid crystal device according to the present invention. In FIG. 1, the ferroelectric liquid crystal device 11 has substrates 12 and 13 using transparent plates such as glass plate or plastic plate, and has a ferroelectric liquid crystal 14 sandwitched therebetween. The respective substrates 12 and 13 have the respective transparent electrodes 15 and 16 in patterns of stripes for forming matrix electrode structures arranged thereon, and on the transparent electrodes are formed alignment control films 17 and 18. The respective color units of red (R), green (G) and blue (B) are formed of materials with colored material concentrations previously set so as to give desired spectral characteristics when their film thickness are equal to each other. On the other hand, for effecting further flattening, a light intercepting layer 10 is formed in the recess between the respective color units, if necessary, and further a protective film or a flattening layer 19 is formed thereon.

In the substrates according to the above constitution, by setting the film thickness of the color filters at substantially the same and suppressing the interval between the filter units at 5 μm or less, the stepped difference due to the recess is corrected, and therefore the substrate surface can be maintained substantially flat, even if transparent electrodes and alignment control films may be successively formed on the filter units.

In the present invention, by flattening as described above, the stepped difference of the color filter substrate can be set at 1000 Å or less, preferably 500 Å or less. If the stepped difference exceeds 1000 Å, in other words, if a non-flattened layer with the intervals between the respective filter units set in the range exceeding 5 μm is used, the liquid crystal device will give rise to an alignment defect in shape of a blade line as shown above in FIG. 5.

The ferroelectric liquid crystal device of the present invention has the color filters of the respective filter units formed with substantially the same film thickness and also the interval $a(\mu m)$ between the color filters of the adjacent respective filter units is $0 \leq a \leq 5$ μm, and therefore the flatness of the substrate becomes good. As the result, there is no stepped difference at the plane in contact with the liquid crystal phase, and the liquid crystal phase sandwitched between said substrates with good flatness is gradually cooled in the temperature process transferring from the isotropic phase to the liquid phase, whereby the liquid phase region is gradually expanded to form a liquid crystal phase of uniform monodomain.

For example, to explain by referring to the above mentioned DOBAMBC exhibiting ferroelectric liquid phase as the liquid phase, when the isotropic phase of DOBAMBC is gradually cooled, phase transition to the smectic A phase (SmA phase) occurs at about 115° C. At this time, if the substrate is subjected to orientation treatment such as rubbing or SiO$_2$oblique vapor deposition, a monodomain, in which the molecular axes of the liquid crystal molecules are parallel to the substrate and are aligned in one direction, is formed. As cooling is further progressed, phase transition to the chiral smectic C phase (SmC* phase) occurs at a specific temperature between about 90° and 75° C., depending on the thickness of the liquid crystal layer. Also, when the thickness of the liquid crystal layer is set at about 2 μm or lower, the spiral of the SmC* phase is loosened to exhibit bistability.

According to a preferred example of the present invention, it is desirable that the film thicknesses of the color filter units may differ for each of R, G and B, particularly with the maximum thickness being set for B color filter units, the minimum thickness for R color filter units, and the intermediate thickness for G color filter units. At this time the maximum film thickness difference X (μm) corresponds to the film thickness difference between the B color filter units and the R color filter units, and generation of alignment defect can be avoided by having color filters built in within the cell, the filters being set at the relationship of $X \leq (1/10) \cdot d_0$ where $X(\mu m)$ is the maximum film thickness difference and $d_0(\mu m)$ is the distance between a pair of the substrates.

Figure 2:
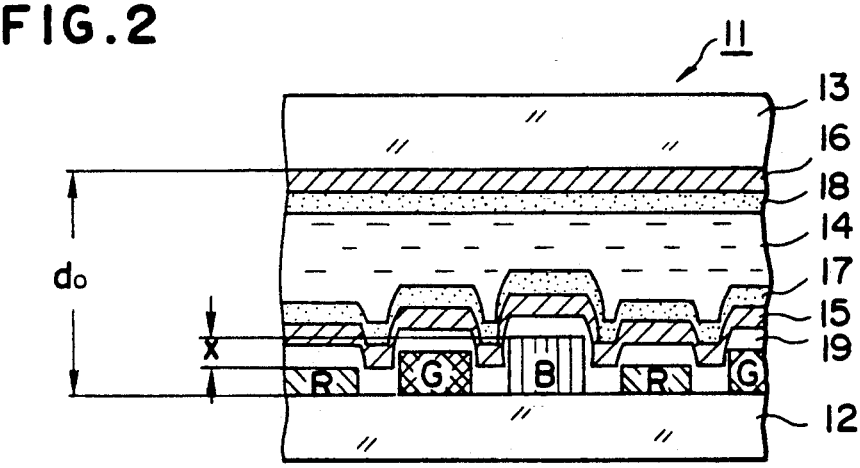

FIG. 2 shows a sectional view of the ferroelectric liquid crystal cell as described above, the same symbols as in FIG. 1 representing the same members. In the ferroelectric liquid crystal device shown in FIG. 2, the relationship of $X \leq (1/10) \cdot d_0$ preferably $(1/20) \cdot d$ is satisfied where $X(\mu m)$ is the maximum film thickness difference of the color filter units (R, G, B) and $d_0(\mu m)$ is the interval of a pair of substrates 12 and 13. Also, as is clarified in Examples as described below, if X is set to exceed $(1/10) \cdot d_0$ alignment defect will occur from the stepped portion, and the ferroelectric liquid crystal at such alignment defect portion was found to give rise to switching defect (exhibiting no normal driving characteristics).

The film thicknesses dR, dG, dB of the color filter units, R, G and B used in the ferroelectric liquid cell shown in FIG. 2 may be set each within the range of 0.5 μm to 1.5 μm, particularly preferably at dB>dG>dR.

In another preferable example of the present invention, generation of the above mentioned alignment defect can be prevented by improving the protective film arranged between the color filters and the transparent electrodes.

Figure 3:
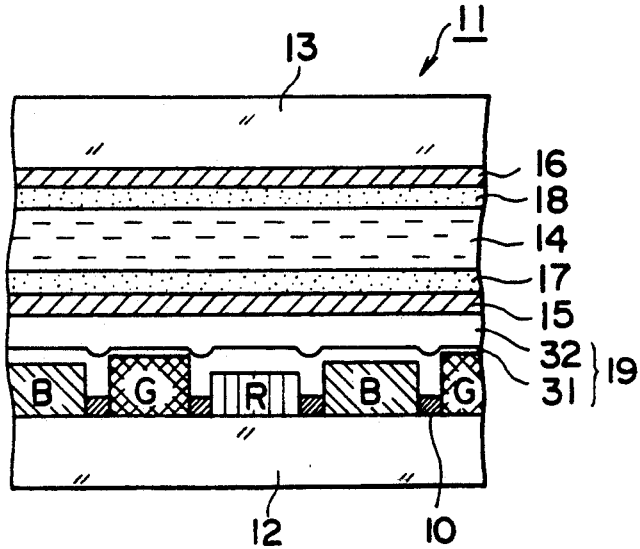

FIG. 3 is a sectional view of such ferroelectric liquid crystal cell, in which the same symbols as in FIG. 1 represent the same members.

In FIG. 3, the ferroelectric liquid crystal device 11 has substrates 12 and 13 using transparent plates such as glass plate or plastic plate, and has a ferroelectric liquid crystal 14 sandwiched therebetween. The respective substrates 12 and 13 have the respective transparent electrodes 15 and 16 in patterns of stripes for forming matrix electrode structures arranged thereon, and on the transparent electrodes are formed alignment control films 17 and 18. The respective color units of red (R), green (G) and blue (B) are formed with film thicknesses set depending on the desired spectral characteristics with stepped differences to some extent.

On the other hand, if desired, a light intercepting layer 10 is formed in the gap between the respective color units. Also, on the color filters, a first transparent resin film 31, which is formed of a lower viscosity resin and is a flattened layer flattening the stepped difference between the picture elements, and a second transparent resin film 32, which is formed of a higher viscosity resin and is the flattened layer and the protective layer for the color filters, are successively laminated.

In the substrate according to the above constitution, since the stepped difference due to film thicknesses of color filters and the recess between the filter units is corrected, the substrate plane can be maintained substantially flat.

The color filter to be used in the present invention is not particularly limited, provided that it has characteristics such as environmental resistance for the conditions in the steps for formation of the ferroelectric liquid crystal device and also has desired durability. It may be prepared by forming a pigment and a layer containing it into a pattern. The layer thickness may be determined depending on the desired spectral characteristics. It may be generally about 0.5 to about 5 μm, preferably about 0.5 to about 1.5 μm, with the layer thickness of each color being preferably as small as possible.

Further, in some cases, in order to improve the display characteristics and make the stepped difference in the gap between the respective color filter units, a light intercepting layer can be more effectively formed by depositing a metallic thin film having light intercepting ability such as chromium, aluminum, etc. according to the vapor deposition method or by applying a light intercepting resin film containing a material having light intercepting ability such as carbon black, composite oxide black pigment, metal powder, etc. dispersed in a photosensitive polyamino type resin according to the coating method.

The first transparent resin film 31 of the present invention is formed primarily for the purpose of flattening the stepped difference on the substrate formed after color filter formation. Accordingly, a resin made to have a lower viscosity is used, and generally a viscosity of 50 cps (centipoise) or less/(under room temperature), preferably a viscosity of 20 to 50 cps is desirable. The color filter surface is coated with liquids, which are controlled to lower viscosity, of organic resin such as polyamide type, polyimide type, polyurethane type, acrylic type, polycarbonate type and silicone type, etc. or solutions of the photosensitive resins thereof according to the coating method such as spin coating, roll coating, dipping, etc., and then are subjected to the photolithographic processing, forming the resin film. Its film thickness may be the thickness necessary for filling the unit gap portion of the color filter, and it is preferable that the thickness is set to be equal to or slightly thicker than the thickness of the thickest unit.

The second transparent resin film 32 is formed on the layer which has been substantially flattened with the first transparent resin film 31, and is formed for the purpose of flattening further the stepped difference owing to the color filters and primarily protecting the color filters. Accordingly, with a resin material with increased resin component, with a viscosity generally exceeding 50 cps (centipoise)/(under room temperature), preferably controlled within the range of about 100 cps to about 1200 cps, for example, with organic resin liquids such as polyamide type, polyimide type, polyurethane type, acrylic type, polycarbonate type and silicone type, etc. or solutions of the photosensitive resins, the film 31 are coated according to the coating method such as spin coating, roll coting, dipping, etc., and then are subjected to the photolithographic steps, forming the resin film 32.

As to the resin material for forming the second resin film 32, it may be same as a material of the first transparent resin film 31 or different, and any desired material can be selected from those having resistance to the respective environments in the cell forming steps of the ferroelectric liquid crystal device and having desired reliability, etc. Its layer thickness may be set as desired from the viewpoints as mentioned above. The layer is generally formed with a thickness of about 0.5 to about 5 μm, preferebly about 0.5 to about 1.0 μm.

According to another preferable example of the present invention, the color filter unit is formed in a trapezoidal shape, and generation of alignment defect as described above can be avoided by having a group of color filters built in the cell, said group having the relationships of $0° < \theta < 90°$ and $0 < w \leq d/\tan \theta$ where $d(\mu m)$ is the film thickness of said color filter unit, $\theta$(degree) is the sectional tapered angle between the bottom and the diagonal side of the color filter unit and w(μm) is the overlapping width between the adjacent color filter units.

Figure 4A:
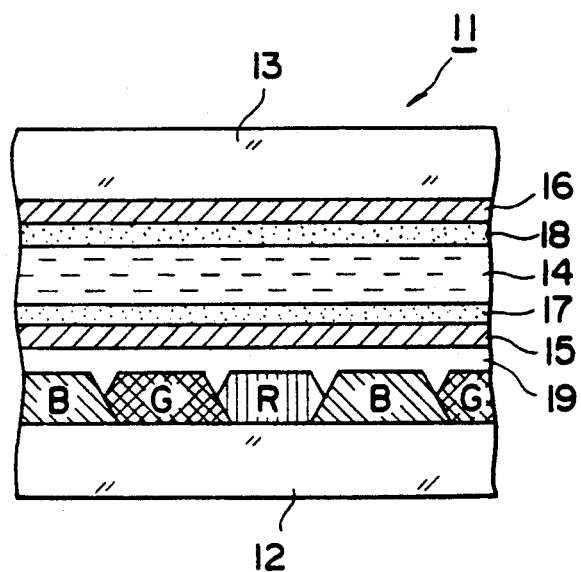

FIG. 4A is a sectional view of the ferroelectric liquid crystal cell as described above, with the same symbols as in FIG. 1 representing the same members.

In the cell shown in FIG. 4, the respective color filter units of R (red), G (green) and B (blue) are formed in trapezoidal shapes, with the colorant concentrations being previously set to give desired spectral characteristics in equal film thicknesses, the tapered angles being formed by control of exposure, having overlapped portions at the adjacent units and a part of the diagonal sides thereof.

Figure 4B:
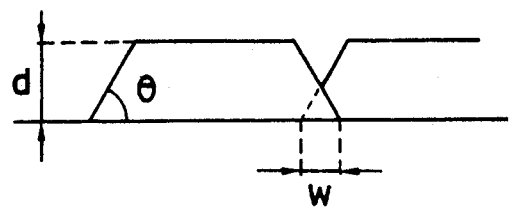

More specifically, when d(μm) is the film thickness of the color filter unit formed in trapezoidal shape as shown in FIG. 4B, $\theta$(degree) is the sectional tapered angle between the bottom and the diagonal side of the color filter unit and w(μm) is the overlapping width between the diagonal sides of the adjacent color filter units, (1) the range of the sectional tapered angle of one unit is set at $0<\theta<90°$, and
(2) the range of the overlapping width between the adjacent units is set at $0<w\leq d/\tan\theta$. If necessary, a protective film or flattening film 19 is formed on the color filter layer.

In the substrate 12 with the above constitution, since the stepped difference due to the film thicknesses of color filters and the recess between units is corrected, the substrate plane can be maintained substantially flat even when transparent electrode 15 and alignment control film 17 may be successively formed on the color filters.

According to another example of the present invention, by arranging a heat-fusible resin film at the gap between the adjacent color filter units of the group of color filter units, generation of the above mentioned alignment defect can be avoided.

Figure 5:
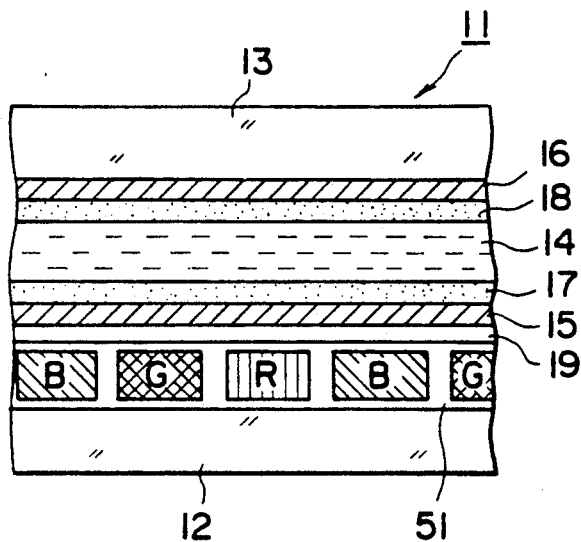

FIG. 5 is a sectional view of the ferroelectric liquid crystal cell as mentioned above, with the same symbols as in FIG. 1 representing the same members. In FIG. 5, a heat-fusible resin film 51 is provided in a form such that the film binds the respective color filter units of R, G and B. The heat-fusible resin film 51 can be provided by coating at least one substrate with a heat-fusible resin and forming color filters on said heat-fusible resin film 51, or by coating the substrate having color filters formed thereon with a heat-fusible resin and then filling the color filter unit gap with the heat-fusible resin film 51 by means of heating or heating under pressurization.

As the heat-fusible resin for forming the heat-fusible resin film 51 used in the present invention, there may be employed polyvinyl acetate, ethylene-vinyl acetate copolymer, polyvinyl chloride, vinyl chloride-vinyl acetate copolymer, polyamide, phenoxy resin, ethyl celulose, polyisobutylene, polyester, terpene resin, rosin and derivatives thereof, petroleum resin, etc., either singly or as a mixture. Desirably, it is effective to use a resin with high transparency.

As the method for forming the heat-fusible resin film 51, the first method forms first a resin layer with a film thickness of about 0.5 to about 5 μm on a substrate according to the coating method such as spin coating, roll coating, dipping, etc. by use of a heat-fusible resin solution. Next, after formation of the color filter layer with pattern formation having the above constitution on said resin layer, the color filter pattern is embedded in the molten resin by the heating treatment under the melting temperature of the heat-fusible resin, or the hot press treatment in parallel to said color filter substrate surface, or by use of air blow, etc., simultaneously with flattening of the surface layer, and then are subjected to fixation by cooling to normal temperature.

On the other hand, the second method comprises forming a color filter pattern on the substrate, then forming the heat-fusible resin film 51 having the same film thickness according to the same coating method as in the above method, subsequently embedding the molten resin in the gaps of the color filter pattern by heat treatment, hot press treatment or air blow, etc. similarly as the above method, simultaneously by flattening the surface layer and then fixing the resulting resin by cooling to normal temperature.

In some cases, for improving the display characteristics, a light intercepting layer can formed at the gaps of the respective color filter units by depositing a metal film having light intercepting ability such as chromium, aluminum, etc. according to the vapor deposition method or by applying a light intercepting resin layer containing a material having light intercepting ability such as carbon black, black pigment of composite oxides, metal powder, etc. according to the coating method.

Further, when it is required to further increase adhesiveness between the heat-fusible resin or the color filter layer and the base substrate, it is more effective to precoat the substrate thin with a silane coupling agent before formation of the heat-fusible resin or the color filter layer, or to use the heat-fusible resin or the color filter layer into which a small amount of a silane coupling agent, etc. is previously added.

For the purpose of protecting the color filter layer and the heat-fusible film 51 from various environmental conditions and further flattening the surface, an organic resin such as polyamide, polyimide, polyurethane, polycarbonate, silicone, etc. or an inorganic film such as $Si_3N_4$, $SiO_2$, $SiO$, $Al_2O_3$, $Ta_2O_3$, etc. can be provided as the protective film or the flattening film generally having the thickness range of about 0.5 to about 5 μm by the coating method such as spin coating, forming the resin film 32 the vapor deposition method.

According to another preferable example of the present invention, generation of the above mentioned alignment defect can be avoided by use of a group of color filter units satisfying the relationship of $0\leq l/d\leq 5$ where l(μm) is the interval between the adjacent color filter units in the group of color filter units and d(μm) is the film thickness of the color filter unit.

Figure 6:
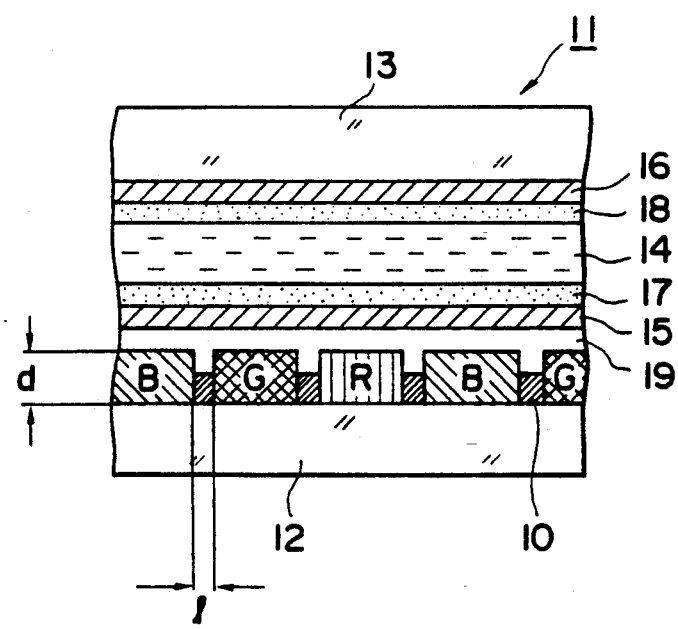

FIG. 6 shows a sectional view of the ferroelectric liquid crystal cell as mentioned above, with the same symbols as in FIG. 1 representing the same members. On the substrate 12 shown in FIG. 6 are formed the color filter units B, G and R with the same film thickness, and simultaneously the interval l(μm) between the color filter units is set at 5-fold or less relative to the film thickness d(μm) of the color filter unit.

The color filter suitable for the present invention may be a filter according to the system capable of setting the film thicknesses of the respective color filter units at substantially same thickness. Particularly the system as described below, according to which a fine pattern can be formed by a simple production process and a color filter excellent in mechanical characteristics as well as various characteristics such as heat resistance, light resistance, solvent resistance, etc. can be afforded, is preferred.

The optimum color filter for the present invention is formed by repeating the photolithographic step of a colored resin comprising a colorant material dispersed in an aromatic polyamide resin or polyimide resin having photosensitive groups in the molecule.

More particularly, the aromatic polyamide resin or polyimide resin having photosensitive groups in the molecule for forming the colored resin layer possessed by the color filter may be preferably one which can give a cured film at 200° C. or lower, for example, which is capable of forming a cured film by heating of about 150° C. for 30 minutes, particularly one having no specific light absorption characteristic in the visible wavelength region (400-700 nm) (one having light transmittance of about 90% or more). From this standpoint, an aromatic polyamide resin is preferred.

Also, as the group having photosensitivity in the present invention, aromatic chains having a photosensitive unsaturated hydrocarbon group as shown below may be employed.

(1) Benzoic acid esters:

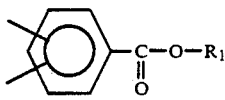

(wherein $R^1$ represents CHX=CY—COO—Z—, X represents —H or —$C_6H_5$, Y represents —H or —$CH_3$, Z represents—or an ethyl group or a glycidyl group);

(2) Benzyl acrylates;

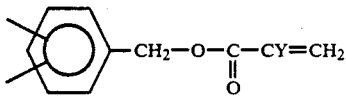

(wherein Y represents —H or $CH_3$);

(3) Diphenyl ethers:

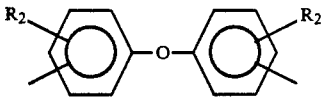

(wherein $R_2$ represents a group containing at least one of CHX=CY—CONH—, $CH_2$=CY—COO—($CH_2$)$_2$—OCO— or $CH_2$=CY—COO—$CH_2$—, X and Y represent the same groups as above);

(4) Chalcons and other compound chains:

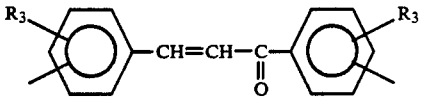

(wherein $R_3$ represents H—, an alkyl group or an alkoxy group);

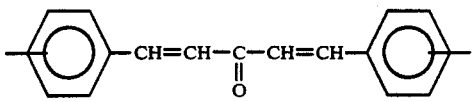

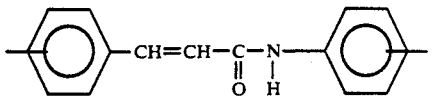

and so on.

Specific examples of the aromatic polyamide resin and polyimide resins having these groups in the molecules may include "Risocoat PA-1000" (trade name, produced by Ube Kosan K.K.), "Risocoat PI-400" (trade name produced by Ube Kosan K.K.).

Generally, few photosensitive resins used in the photolithographic step are excellent in mechanical characteristics and durability such as heat resistance, light resistance, solvent resistance, although there in such characteristics may be different depending on the chemical structure. In contrast, the above photosensitive polyamino type resin of the present invention is a resin excellent in these durabilities, also in chemical structure, and the durability of the color filter formed by use of these also becomes very good. Particularly, excellent performances will be exhibited for heat resistance during sputter formation of a transparent electroconductive film on the color filter and for breakage of the color filter owing to inner spacer during assembling of the liquid crystal device, such heat resistance and breakage being significant for the color filter for ferroelectric liquid crystal device.

The colorant material for forming the colored resin layer possessed by the color filter in the present invention is not particularly limited in organic pigments, inorganic pigments, dyes, etc., provided that desirable spectral characteristics can be obtained. In this case, each material can be used singly or as a mixture of some of these. However, when a dye is used, the performance of the color filter is governed by the durability of the dye itself, whereas when the above resin system is used, a color filter with better performance than conventionally dyed color filters are obtained. Accordingly, in view of the color characteristics and various performances of the color filter, an organic pigment is the most preferred as the colorant material.

As the organic pigment, there may be employed typically azo type pigments such as soluble azo type, insoluble azo type, condensed azo type, etc., also phthalocyanine type pigments, and indigo type, anthraquinone type, perylene type, perynone type, dioxazine type, quinacridone type, isoindolinone type, phthalone type, methine·azomethine type, other condensed polycyclic pigments containing metal complex type or mixtures of some of these.

In the present invention, the colored resin to be used for formation of the colored resin layer may be prepared by formulating each of the above colorant materials having desired spectral characteristics under the same film thickness for each color into the above photosensitive polyamino type resin solution at a proportion of about 10 to about 70 wt. %, dispersing sufficiently the colorant materials by use of supersonic, three-rolls, ball mill, sand mill, etc., and preferably then removing the colorant material of great particle size through a filter of 1 μm or less.

The colored resin layer possessed by the color filter in the present invention is formed by coating the above colored resin onto a substrate according to a coating device such as spinner, roll coater, etc. and then forming it into a pattern shape according to the photolithographic step, and its layer thickness may be determined depending on the desired spectral characteristics. The colored layer generally has the same thickness for each color of about 0.5 to about 3.0 μm, preferably about 0.5 to about 1.5 μm.

When it is required to further increase adhesion between the colored resin layer and the substrate of the base, it is further effective to coat previously the substrate thin with a silane coupling agent, etc. before pattern formation of the colored resin, or to form the color filter by use of a material having a small amount of a silane coupling agent, etc. previously added into the colored resin.

The colored resin layer possessed by the color filter of the present invention is constituted of a material having itself sufficient durability. Particularly, for protection of the colored resin layer from various environmental conditions or flattening of the color filter surface, an organic resin such as polyamide, polyimide, polyurethane, polycarbonate, silicone type, etc. or an inorganic film such as $Si_3N_4$, $SiO_2$, SiO, $Al_2O_3$, $Ta_2O_3$, etc. can be provided as the protective film or the flattening film according to the coating method such as spin coating, roll coating, etc., or according to the vapor deposition method.

In this case, the color filter surface becomes a shape with less stepped difference, which is suitable for removing the alignment defect of the ferroelectric liquid crystal device as intended by the present invention.

The film thickness of the protective film 19 can determine the film thickness of the ferroelectric liquid crystal 14 and therefore may vary depending on the kind of the liquid crystal material and the response speed required, etc., and it is generally set in the range of 0.2 μm to 20 μm, preferably 0.5 μm to 10 μm.

Also, in some cases, for improving display characteristics and making the gap stepped difference between the respective units smaller, light intercepting layers can be formed, correspondingly between the respective units, by depositing a metal thin film having light intercepting ability such as chromium, aluminum, etc. according to the deposition method or by applying a light intercepting resin layer containing a material having light intercepting ability such as carbon black, black pigment of composite oxides, metal powder, etc. dispersed in a photosensitive polyamide or polyimide resin according to the coating method.

The material for the alignment control film to be used in the present invention may be selected from, for example, resins such as polyvinyl alcohol, polyimide, polyamideimide, polyester, polycarbonate, polyvinyl acetal, polyvinyl chloride, polyvinyl acetate, polyamide, polystyrene, cellulose resin, melamine resin, urea resin, acrylic resin, etc., or photosensitive polyimide, photosensitive polyamide, cyclic rubber type photoresist, phenol novolac type photoresist or electron beam photoresist (polymethyl methacrylate, epoxidized 1,4-polybutadiene, etc.) and so on. The thickness of the alignment control film 7 is set generally in the range of 10 Å to 1 μm, preferably 100 Å to 3000 Å, depending on the film thickness of the ferroelectric liquid crystal.

As the liquid crystal material to be used in the present invention, particularly suitable ones are liquid crystals having bistability and ferroelectric characteristics. Specifically, liquid crystals of the chiral smectic phase (SmC*), the H phase (SmH*), the I phase (SmI*), the J phase (SmJ*), the K phase (SmK*), the G phase (SmG*) or the F phase (SmF*) can be used.

Details of the ferroelectric liquid crystals are described in "LE JOURNAL DE PHYSIQUE LETERS", 1975, 36, (L-69), "Ferroelectric Liquid Crystals"; "Applied Physics Letters", 1980, 36 (11), Submicro Second Bistable Electrooptic Switching in Liquid Crystals; "Solid Physics", 1981, 16 (141), "Liquid Crystal", U.S. Pat. Nos. 4561726, 4589996, 4596667, 4613209, 4614609, 4639089, and the ferroelectric liquid crystals disclosed in these references can be used in the present invention.

Specific examples of ferroelectric liquid crystal may include
desiloxybenzylidene-p'-amino-2-methylbutylcinnamate (DOBAMBC),
hexyloxybenzylidene-p'-amino-2-chloropropylcinnamate (HOBACPC),
4-o-(2-methyl)-butylresorcilidene-4'-octylaniline (MBRAS).

When the device is constituted by use of these materials, since the temperature state is maintained so that the liquid crystal compound may become the chiral smectic phase, the device can be supported by, e.g., a block in which heater is embedded, if necessary.

Figure 7:
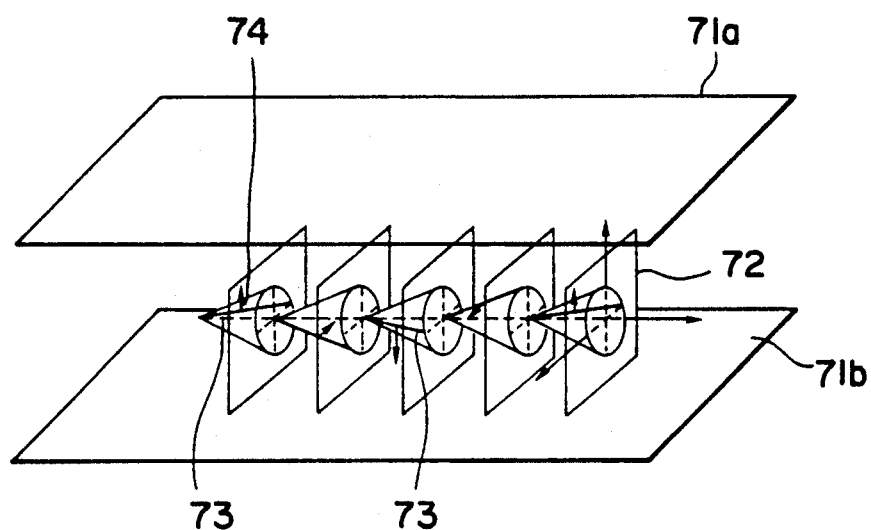
FIG. 7 and FIG. 8 are perspective views showing schematically the ferroelectric liquid crystals used in the present invention.

FIG. 7 illustrates schematically an example of cell for description of actuation of the ferroelectric liquid crystal. 71a and 71b are substrates (glass plates) covered with transparent electrode comprising a thin film of $In_2O_3$, $SnO_2$ or ITO (Indium Tin Oxide), etc., and therebetween is sealed a liquid crystal of the SmC* phase or the SmH* phase with a plurality of liquid crystal molecular layers 72 being aligned perpendicularly to the glass surface. The line 73 indicated by bold line represents the liquid crystal molecule, and the liquid crystal molecule 73 has dipole moment (P⊥) 74 in the direction orthogonal to the molecule. When a voltage of a certain threshold value or higher is applied between the electrodes on the substrate 71a and 71b, the spiral structure of the liquid crystal molecule 73 can be loosened to change the aligned direction of the liquid crystal molecules 73 so that the dipole moment (P⊥) 74 may be all directed to the electrical field direction. The liquid crystal molecule 73 has a slender shape, exhibiting refractive index anisotropy in its longer axis direction and shorter axis direction. Therefore, it is readily understood that when, or example, polarizers positioned at the positional relationship of crossed Nicols to each other are arranged on upper and lower sides of the glass surface, a liquid crystal optical modulating device can vary its optical characteristics according to the polarity of the applied voltage.

The liquid crystal cell to be used preferably in the ferroelectric liquid crystal device of the present invention can have a thickness which can be made sufficiently thin (e.g. 10 μ or less). As the liquid crystal phase becomes thus thinner, the spiral structure of the liquid crystal molecule will be loosened even when no electrical field is applied, becoming a non-spiral structure, whereby its dipole moment Pa or Pb takes either the state directed upwardly (84a) or downwardly (84b). When an electrical field Ea or Eb with different polarity of a certain threshold value or higher is imparted to such a cell, the dipole moment will change the direction upwardly 84a or downwardly 84b corresponding to the electrical field vector of the electrical field Ea or Eb, whereby the liquid crystal molecules will be aligned in either one of the first stable state 83a or the second stable state 83b.

Figure 8:
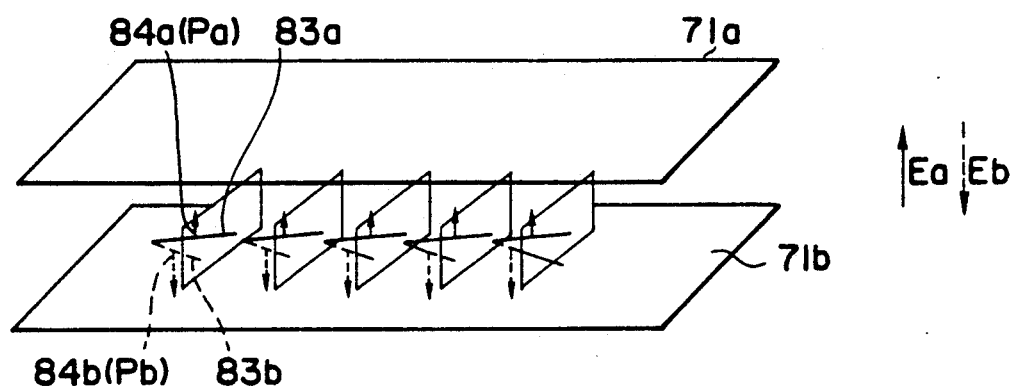

There are two advantages as mentioned above brought about by use of such ferroelectric liquid crystal as the optical modulating device. The first one is the extremely rapid response speed, and the second one is that the alignment of liquid crystal molecules has bistability. To explain further the second point by referring to, for example, FIG. 8, liquid crystal molecules will be aligned into the first stable state 83a by application of the electrical field Ea, and this state is stable even if the electrical field may be turned off. On the other hand, when the electrical field Eb in the opposite direction is applied, the liquid crystal molecules will be aligned into the second stable state 83b to change the direction of molecules, but they also remain under this state even when the electrical field may be turned off. Also, as long as the electrical field Ea does not exceed a certain threshold value, the respective aligned states are still maintained. For such rapid response speed and bistability to be realized effectively, the cell should be preferably as thin as possible.

For the ferroelectric liquid crystal device exhibit desired driving characteristics, the ferroelectric crystal arranged between a pair of parallel substrates is required to take the molecular alignment state such that conversion between the above two stable states may effectively occur irrespectively of the applied state of electrical field. For example, for a ferroelectric liquid crystal having the chiral smectic phase, it is required that a region in which the liquid crystal molecule layer of the chiral smectic phase is arranged vertically to the substrate surface, and therefore the liquid crystal molecule axis in substantially parallel to the substrate surface (monodomain) should be formed. For this purpose, a uniformly aligned monodomain can be effectively formed with the alignment control films 17 and 18 as described above.

The present invention is described in detail below by referring to the following Examples.

EXAMPLE 1

FIGS. 9A-9F are diagrams of the steps showing the formation steps of the color filter units of the three colors R, G and B.

First, on #7059 glass substrate 91 produced by Corning was formed a colored resin layer 92 by coating of a blue colored resin material capable of obtaining desired spectral characteristics [the blue colored resin material being a photosensitive colored resin material prepared by dispersing Heliogen Blue L7080 (trade name, produced by BASF Co., C.I. No. 74160) in PA-1000C (trade name, produced by Ube Kosan K.K., polymer content=10%, solvent: N-methyl pyrrolidone, pigment:polymer=1:2)] according to spinner coating to a film thickness of 1.5 μm (see FIG. 9A).

Figure 9A:
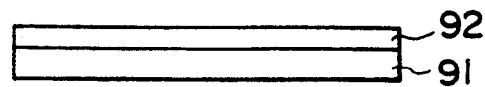
FIG. 9 through FIG. 14 are sectional views showing the production processes of the color filter substrates used in the present invention.
Figure 9B:
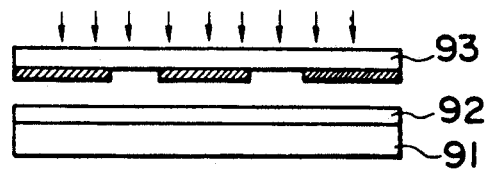

Next, said colored resin layer 92, after prebaked at 80° C. for 30 minutes, was subjected to exposure by use of a high pressure mercury lamp through a photomask 93 corresponding to the pattern shape to be formed (see FIG. 9B).

Figure 9C:
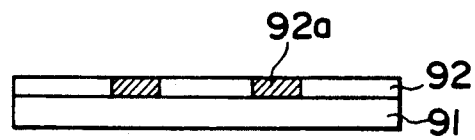
Figure 9D:
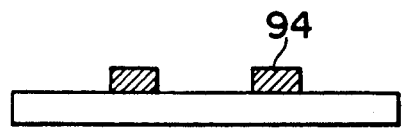
Figure 9E:
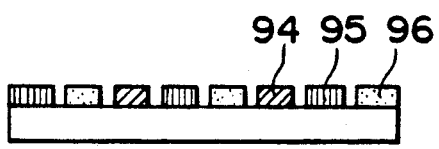

After exposure, as shown in FIG. 9C, the layer 92 was developed by use of supersonic with an exclusive developer (comprising N-methyl-2-pyrroidone as the main component) which dissolved only the unexposed portion of the colored resin layer 92 having the photocured portion 92a, and then the layer 92 was treated with an exclusive rinse solution (e.g. a rinse solution comprising isopropyl alcohol as the main component), followed by post-baking at 150° C. for 30 minutes, to form a blue pattern colored resin layer 94 having a pattern shape (see FIG. 9D).

Subsequently, on the glass substrate having a blue colored pattern formed thereon, a green pattern colored resin layer 95 was formed at the predetermined portion on the substrate with an interval of 5 μm or less set from the blue colored resin layer in the same manner as described above except for using as the second color a green colored resin material [photosensitive colored resin material prepared by dispersing Lionol Green 6YK (trade name, produced by Toyo Ink, C.I. No. 74265) in PA-1000 C (trade name, produced by Ube Kosan K.K., polymer content=10%, solvent: N-methyl-2-pyrrolidone, pigment:polymer=1:2)].

Further, on the substrate having thus formed blue and green patterns thereon, a red pattern colored resin layer 96 was formed at the predetermined portion on the substrate with the respective intervals of 5 μm or less set from the blue colored resin layer and the green colored resin layer in the same manner as described above except for using as the third color a red colored resin material [photosensitive colored resin material prepared by dispersing Irgazine Red BPT (trade name, produced by Ciba-Geigy Co., C.I. No. 71127) in PA-1000 C (trade name, produced by Ube Kosan K.K., polymer content=10%, solvent: N-methyl-2-pyrrolidone, pigment:polymer=1:2], thus obtaining a colored pattern of the three color stripes of R (red), G (green) and B (blue) (see FIG. 9E).

Next, on the glass substrate having the colored pattern of the three colors formed thereon, as the light intercepting layer, a light intercepting layer 97 with a light intercepting pattern was formed in conformity with the gap between the respective units according to a method similar to that as described above by use of a black colored resin material [photosensitive colored resin material prepared by dispersing Carbon Black (C.I. No. 77266) in PA-1000 C (polymer content=10%, pigment:polymer=1:4)]. By this, the gap $a(\mu m)$ between the respective units could be made to fall within the range of $0 \leq a \leq 5$ μm.

Figure 9F:
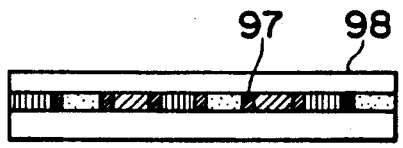

On the color filter pattern thus obtained, as the protective film or the flattening film 98, a film the same transparent resin material as used for the colored resin material [PA-1000 C (trade name, produced by Ube Kosan K.K., polymer content=10%, solvent:

N-methyl-2-pyrrolidone)] was formed by the spinner coating method to a film thickness of about 0.5 μm (see FIG. 9F).

As described above, a flat color filter substrate could be formed.

Next, as shown in FIG. 1, ITO film was formed according to the sputtering method to a thickness of 500 Å to form transparent electrode 15. The electrode was coated with a polyimide forming solution ("PIQ" produced by Hitachi Kasei Kogyo) by a spinner rotating at 3000 rpm, followed by heating at 150° C. for 30 minutes to form a polyimide coating of 2000 Å as the alignment control film 17. Then, rubbing treatment was applied on the polyimide coating surface.

The color filter substrate thus formed and confronting substrate 13 were adhered together to be assembled into a cell, and "CS-1014" (trade name) produced by Chisso K.K. which is a ferroelectric liquid crystal was injected therein and sealed to obtain a liquid crystal device. When the liquid crystal device was observed by means of a polarizing microscope of crossed Nicols, it was confirmed that no orientation defect was formed in the internal liquid crystal molecules.

As described above, according to the present invention, there is no film thickness difference in the color filter layer on the substrate, and moreover the respective filter units are positioned within the interval $\alpha(\mu m)$ in the range of $0 \leq \alpha < 5$ $\mu m$, and further a light intercepting layer, a protective or flattening layer, if necessary, are provided, whereby it has become possible to remove even fine stepped differences occurring between the respective color filter units, and generation of alignment defect can be avoided to provide a ferroelectric liquid crystal device which can exhibit fully the characteristics of a ferroelectric liquid crystal.

Additionally, according to the present invention, it has become possible to prepare a color filter portion having a fine pattern having also excellent mechanical strength as well as various excellent characteristics such as heat resistance, light resistance, solvent resistance, etc. according to simple preparation steps, whereby a color ferroelectric liquid crystal having excellent performances could be provided.

Next, a cell was prepared according to entirely the same procedure as described above except that the interval $\alpha$ ($\mu m$) between the color filter units was set at 8 $\mu m$. As the result, alignment defects around the stepped portions of the color filters could be confirmed.

EXAMPLE 2

First, on #7059 glass substrate 91 produced by Corning was formed a colored resin layer 92 by coating of a blue colored resin material capable of obtaining desired spectral characteristics [the blue colored resin material being a photosensitive colored resin material prepared by dispersing Heliogen Blue L7080 (trade name, produced by BASF Co., C.I. No. 74160) in PA-1000C (trade name, produced by Ube Kosan K.K., polymer content=10%, solvent: N-methyl pyrrolidone, pigment:polymer=1:2)] according to spinner coating to a film thickness of 1.5 $\mu m$.

Next, said colored resin layer, after prebaked at 80° C. for 30 minutes, was subjected to exposure by use of a high pressure mercury lamp through a photomask corresponding to the pattern shape to be formed.

After exposure, the colored resin layer was developed by use of supersonic with an exclusive developer (comprising N-methyl-2-pyrrolidone as the main component) which dissolved only the unexposed portion of the colored resin layer having the photocured portion, and then the colored resin layer was treated with an exclusive rinse solution (e.g. a rinse solution comprising isopropyl alcohol as the main component), followed by post-baking at 180° C. for 30 minutes, to form a blue pattern colored resin layer having a pattern shape.

Subsequently, on the glass substrate having a blue colored pattern formed thereon, a green pattern colored resin layer was formed at the predetermined portion on the substrate in the same manner as described above except for using as the second color a green colored resin material [photosensitive colored resin material prepared by dispersing Lionol Green 6YK (trade name, produced by Toyo Ink, C.I. No. 74265) in PA-1000 C (trade name, produced by Ube Kosan K.K., polymer content=10%, solvent: N-methyl-2-pyrrolidone, pigment:polymer=1:2)].

Further, on the substrate having thus formed blue and green patterns thereon, a red pattern colored resin layer was formed at the predetermined portion on the substrate in the same manner as described above except for using as the third color a red colored resin material [photosensitive colored resin material prepared by dispersing Irgazine Red BPT (trade name, produced by Ciba-Geigy Co., C.I. No. 71127) in PA-1000 C (trade name, produced by Ube Kosan K.K. polymer content=10%, solvent: N-methyl-2-pyrrolidone, pigment:polymer=1:2)], thus obtaining a colored pattern of the three color stripes of R (red), G (Green) and B (blue) with the maximum film thickness difference of 0.1 $\mu m$.

Next, on the glass substrate having the colored pattern of the three colors formed thereon, as the light intercepting layer, a light intercepting layer with a light intercepting pattern was formed in conformity with the gap between the respective units according to the same method as described above by use of a black colored resin material [photosensitive colored resin material prepared by dispersing Carbon Black (C.I. No. 77266) in PA-1000 C (polymer content=10%, pigment:polymer=1:4)].

On the color filter pattern thus obtained, as the protective film or the flattening film, a film of the same transparent resin material as used for the colored resin material [PA-1000 C (trade name, produced by Ube Kosan K.K., polymer content=10%, solvent: N-methyl-2-pyrrolidone)] was formed by the spinner coating method to a film thickness of about 0.5 $\mu m$.

As described above, a flat color filter substrate could be formed.

Next, as shown in FIG. 2, ITO film was formed according to the sputtering to a thickness of 500 Å to form transparent electrode 15. The electrode was coated with a polyimide forming solution ("PIQ" produced by Hitachi Kasei Kogyo) by a spinner rotating at 3000 rpm, followed by heating at 150° C. for 30 minutes to form a polyimide coating of 2000 Å as the alignment control film 17. Then, rubbing treatment was applied on the polyimide coating surface.

The color filter substrate thus formed and confronting substrates 13 were adhered together to be assembled into a cell, and a ferroelectric liquid crystal was injected therein and sealed to obtain a liquid crystal device. When the liquid crystal device was observed by a polarizing microscope of crossed Nicols, it was confirmed that no orientation defect was formed in the internal liquid crystal molecules.

Next, a cell was prepared according to entirely the same procedure as described above except that the maximum film thickness difference was set at 0.3 $\mu m$. As the result, alignment defects around the stepped difference portions of the color filters could be confirmed.

EXAMPLE 3

FIGS. 10A-10G are the diagrams of the steps showing an example of the formation steps of the color units of color filters of the three colors of R, G and B.

This Example describes about the case by use of a color filter formed by repeating the photolithographic step of a colored resin comprising a colorant material dispersed in polyamide having photosensitive group in the molecule, which is the excellent system in which the film thickness of the respective color units can be made substantially constant by setting previously the concentration of the colorant materials and fine patterns can be formed by a simple preparation process, and which is further excellent in mechanical characteristics and also in various excellent characteristics such as heat resistance, light resistance, solvent resistance, etc.

First, on #7059 glass substrate 101 produced by Corning was formed a colored resin layer 102 by coating of a blue colored resin material capable of obtaining desired spectral characteristics [the blue colored material being a photosensitive colored resin material prepared by dispersing Heliogen Blue L7080 (trade name, produced by BASF Co., C.I. No. 74160) in PA-1000C (trade name, produced by Ube Kosan K.K., polymer content=10%, solvent: N-methyl pyrrolidone, pigment:polymer=1:2)] according to spinner coasting to a film thickness of 1.5 μm (see FIG. 10A).

Figure 10A:
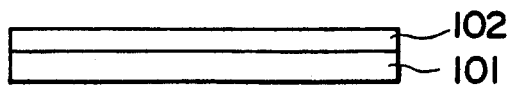
Figure 10B:
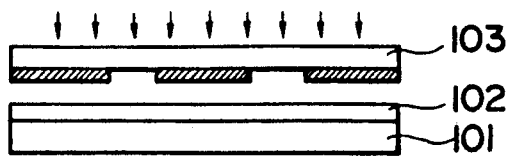

Next, said colored resin layer 102, after prebaked at 80° C. for 30 minutes, was subjected to exposure by use of a high pressure mercury lamp through a photomask 103 corresponding to the pattern shape to be formed (see FIG. 10B).

Figure 10C:
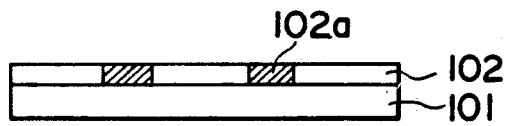
Figure 10D:
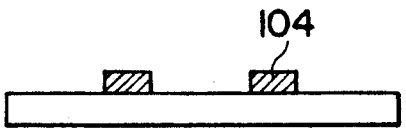
Figure 10E:
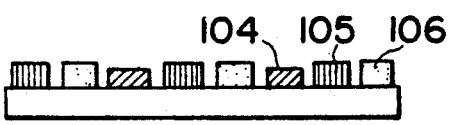
Figure 10F:
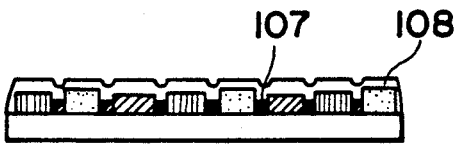
Figure 10G:

After exposure, as shown in FIG. 10C, the layer 102 was developed by use of supersonic with an exclusive developer (comprising N-methyl-2-pyrroidone as the main component) which dissolved only the unexposed portion of the colored resin layer 102 having the photocured portion 102a, and then the layer was treated with an exclusive rinse solution (e.g. a rinse solution comprising isopropyl alcohol as the main component), followed by post-baking at 150° C. for 30 minutes, to form a blue pattern colored resin layer 104 having a pattern shape (see FIG. 10D).

Subsequently, on the glass substrate having a blue colored pattern formed thereon, a green pattern colored resin layer 105 was formed at the predetermined portion on the substrate in the same manner as described above except for using as the second color a green colored resin material [photosensitive colored resin material prepared by dispersing Lionol Green 6YK (trade name, produced by Toyo Ink, C.I. No. 74265) in PA-1000 C (trade name, produced by Ube Kosan K.K., polymer component=10%, solvent: N-methyl-2-pyrrolidone, pigment:polymer=1:2)].

Further, on the substrate having thus formed blue and green patterns thereon, a red pattern colored resin layer 106 was formed at the predetermined portion on the substrate in the same manner as described above except for using as the third color a red colored resin material [photosensitive colored resin material prepared by dispersing Irgazine Red BPT (trade name, produced by Ciba-Geigy Co., C.I. No. 71127) in PA-1000 C (trade name, produced by Ube Kosan K.K. polymer component=10%, solvent: N-methyl-2-pyrrolidone, pigment:polymer=1:2], thus obtaining a colored pattern of the three color stripes of R (red), G (green) and B (blue) (see FIG. 10E).

Next, on the glass substrate having the colored pattern of the three colors formed thereon, as the light intercepting layer, a light intercepting layer 107 with a light intercepting pattern was formed in conformity with the gap between the respective picture elements according to the same method as described above by use of a black colored resin material [photosensitive colored resin material prepared by dispersing Carbon Black (C.I. No. 77266) in PA-1000 C (polymer component=10%, pigment:polymer=1:4)].

On the color filter pattern thus obtained, the first transparent resin layer 108 was formed by applying a photosensitive polyamide resin solution previously controlled to have a viscosity of 50 cps [PA-1000 C (trade name, produced by Ube Kosan K.K., solvent: N-methyl-2-pyrrolidone)] according to the spinner coating method to a film thickness of about 0.5 μm see FIG. 10F).

Prebaking (70° C. for 20 minutes), exposure, developing, rinsing and post-baking (150° C. for 30 minutes) treatments were conducted to form a flattened layer, and then on said transparent resin layer 108 was formed, as the second transparent resin layer 109, a film of a photosensitive polyamide resin solution previously controlled to have a viscosity of 100 cps [PA-1000C (trade name, produced by Ube Kosan K.K., solvent: N-methyl-2-pyrrolidone)] by the spinner coating method to a film thickness of about 1 μm (see FIG. 10G).

Prebaking (70° C. for 20 minutes), exposure, developing, rinsing, post-baking (150° C. for 30 minutes) treatments were conducted to form a protective film.

As described above, a flat color filter substrate could be formed.

Next, as shown in FIG. 3, ITO film was formed according to the sputtering method to a thickness of 500 Å to form transparent electrode 15. The electrode was coated with a polyimide forming solution ("PIQ" produced by Hitachi Kasei Kogyo) by a spinner rotating at 3000 rpm, followed by heating at 150° C. for 30 minutes to form a polyimide coating of 2000 Å as the alignment control film 17. Then, rubbing treatment was applied on the polyimide coating surface.

The color filter substrate thus formed and confronting substrates 13 were adhered together to be assembled into a cell, and a ferroelectric liquid crystal was injected therein and sealed to obtain a liquid crystal device. When the liquid crystal device was observed by means of a polarizing microscope of crossed Nicols, it was confirmed that no orientation defect was formed in the internal liquid crystal molecules.

As described above, according to the present invention, even when there is difference in film thickness of the color filter layers on the substrate, by laminating succesively a first transparent resin layer formed of a lower viscosity resin which brings about flattening on said color filter layers and a second transparent resin layer formed of a higher viscosity resin which brings about flattening and protection, it becomes possible to remove fine stepped differences in film thickness difference occurring between the respective color filter units or stepped difference in the respective unit intervals, whereby generation of alignment defect can be avoided to provide a ferroelectric liquid crystal device capable of exhibiting fully the characteristics of a ferroelectric liquid crystal.

Next, a cell was prepared according to entirely the same procedure as described above except for omitting use of the first transparent resin film and the second transparent resin film. As the result, alignment defects around the stepped difference portions of the color filters could be confirmed.

EXAMPLE 4

FIGS. 11A-11G are the diagrams of the steps showing the formation steps of the color units of the three colors of R, G and B.

First, on #7059 glass substrate 111 produced by Corning was formed a colored resin layer 112 by coating of a blue colored resin material capable of obtaining desired spectral characteristics [the blue colored resin material being a photosensitive colored resin material prepared by dispersing Heliogen Blue L7080 (trade name, produced by BASF Co., C.I. No. 74160) in PA- 1000C (trade name, produced by Ube Kosan K.K., polymer content=10%, solvent: N-methyl pyrrolidone, pigment:polymer=1:2)] according to spinner coating to a film thickness of 1.5 μm (see FIG. 11A).

Figure 11A:
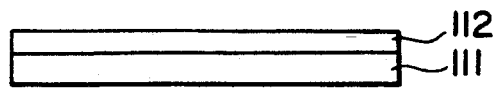
Figure 11B:
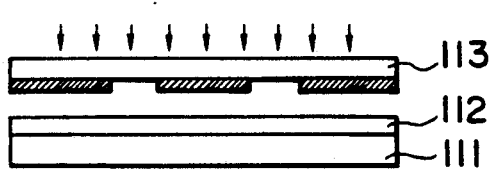

Next, said colored resin layer 112, after prebaked at 80° C. for 30 minutes, was subjected to excess exposure by use of a high pressure mercury lamp through a photomask 113 corresponding to the pattern shape to be formed (see FIG. 11B).

Figure 11C:
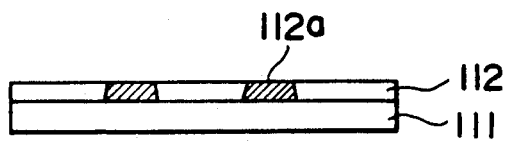
Figure 11D:
Figure 11E:
Figure 11F:
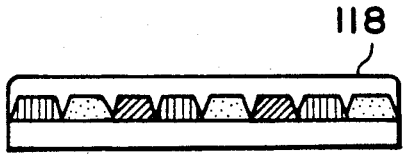

After exposure, as shown in FIG. 11C, the layer 112 was developed by use of supersonic with an exclusive developer (comprising N-methyl-2-pyrrolidone as the main component) which dissolved only the unexposed portion of the colored resin layer 102 having the photocured portion 102a, and the layer 112 was treated with an exclusive rinse solution (e.g. a rinse solution comprising isopropyl alcohol as the main component), followed by post-baking at 150° C. for 30 minutes, to form a blue pattern colored resin layer 114 having a tapered shape (angle=15°) at the end of the trapezoidal shape (see FIG. 11D).

Subsequently, on the glass substrate having a blue colored pattern formed thereon, a green pattern colored resin layer 115 was formed, partially overlapping with the blue pattern shape colored resin layer (overlapping width w=5 μm) at the predetermined portion on the substrate in the same manner as described above except for using as the second color a green colored resin material [photosensitive colored resin material prepared by dispersing Lionol Green 6YK (trade name, produced by Toyo Ink, C.I. No. 74265) in PA-1000 C (trade name, produced by Ube Kosan K.K., polymer content=10%, solvent: N-methyl-2-pyrrolidone, pigment:polymer=1:2)].

Further, on the substrate having thus formed blue and green patterns thereon, a red pattern colored resin layer 116 was formed, partially overlapping with the blue pattern colored resin layer and the green pattern colored resin layer (overlapping width w=5 μm) at the predetermined portion on the substrate in the same manner as described above except for using as the third color a red colored resin material [photosensitive colored resin material prepared by dispersing Irgazine Red BPT (trade name, produced by Ciba-Geigy Co., C.I. No. 71127) in PA-1000 C (trade name, produced by Ube Kosan K.K., polymer content=10%, solvent: N-methyl-2-pyrrolidone, pigment:polymer=1:2), thus obtaining a colored pattern of the three color stripes of R (red), G (green) and B (blue) (see FIG. 11E).

Next, on the glass substrate having the colored pattern of the three colors formed thereon, as the light intercepting layer, a light intercepting layer 117 with a light intercepting pattern was formed in conformity with the gap between the respective units according to the same method as described above by use of a black colored resin material [photosensitive colored resin material prepared by dispersing Carbon Black (C.I. No. 77266) in PA-1000 C (polymer content=10%, pigment:polymer=1:4)].

On the color filter pattern thus obtained, as the protective film or flattening film 118, a film of the same transparent resin material as used for the colored resin material [PA-1000 C (trade name, produced by Ube Kosan K.K., polymer content=10%, solvent: N-methyl-2-pyrrolidone)] was formed by the spinner coating method to a film thickness of about 1.0 μm (see FIG. 11F).

As described above, a flat color filter substrate could be formed.

Next, as shown in FIG. 4, ITO film was formed according to the sputtering method to a thickness of 500 Å to form transparent electrode 15. The electrode was coated with a polyimide forming solution ("PIQ" produced by Hitachi Kasei Kogyo) by a spinner rotating at 3000 rpm, followed by heating at 150° C. for 30 minutes to form a polyimide coating of 2000 Å as the alignment control film 17. Then, rubbing treatment was applied on the polyimide coating surface.

The color filter substrate thus formed and confronting substrate 13 were adhered together to be assembled into a cell, and a ferroelectric liquid crystal was injected therein and sealed to obtain a liquid crystal device. When the liquid crystal device was observed by a polarizing microscope of crossed Nicols, it was confirmed that no orientation defect was formed in the internal liquid crystal molecules.

As described above, according to the present invention, by setting a tapered angle at the range of 0° to 90° to the color filter picture elements on the substrate and providing overlapping portions between the adjacent units in the range of 0 to [d (film thickness)/tan θ (tapered angle)], the stepped difference in the unit interval can be alleviated to $\frac{1}{2}$ at the maximum as compared with conventional unit pattern, and even in the case when there is unit deviation caused by alignment stepped difference during unit formation, the stepped difference caused thereby can be reduced to $\frac{1}{2}$ of the conventional case, whereby generation of alignment defect can be avoided to provide a ferroelectric liquid crystal device capable of exhibiting fully the characteristics of a ferroelectric liquid crystal.

EXAMPLE 5

FIGS. 12A–12G are diagrams of steps showing a first formation step including the three color filter layers and a heat-fusible resin layer.

First, on #7059 glass substrate 121 produced by Corning Co., the heat-fusible resin layer 125 was formed by applying a methyl acetate solution of an ethylene-vinyl acetate copolymer at a layer thickness of 1.0 μm by use of a spinner. Then, the layer 125 was coated with a positive-type resist (trade name: OFPR 77, produced by Tokyo Oka) at a layer thickness of 1.0 μm by use of a spinner to provide a resist layer 122 (see FIG. 12A). Next, by use of a predetermined pattern mask, the resist layer was exposed to light (see FIG. 12B) and developed with an ODUR 1010 series exclusive developer to form a resist pattern 122a for lift-off having a predetermined stripe shape (see FIG. 12C).

Next, the whole surface of the pattern-formed surface of the glass substrate 121 was exposed to light, and further unnecessary resist residue other than the pattern portion was removed from the glass substrate 121 by oxygen plasma ashing treatment.

The glass substrate 121 having thus the pattern 122a for lift-off formed thereon was arranged at a predetermined position in a vacuum vapor deposition apparatus, nickel phthalocyanine was placed as the blue dye for vapor deposition in the molybdenum boat as the vaporization source, and a colored layer 124 was formed by vapor deposition of nickel phthalocyanine to a thickness of 4500 Å on the pattern formed surface for lift-off by controlling the vaporization temperature of the former to 470° C. (see FIG. 12D).

Figure 12A:
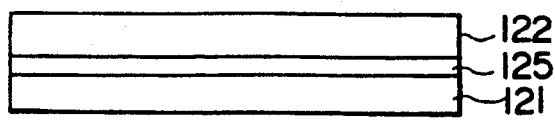
Figure 12B:
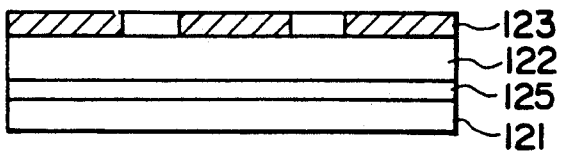
Figure 12C:
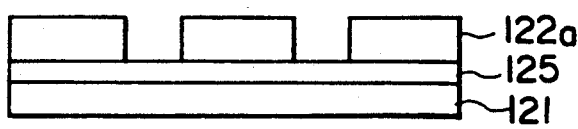
Figure 12D:
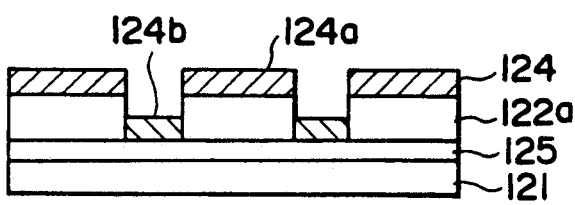
Figure 12E:
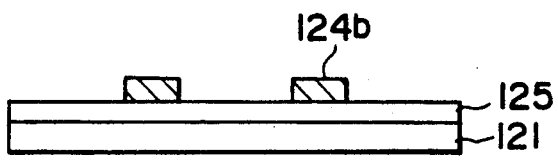

The substrate 121 having the pattern 122a and the colored layer 124 formed thereon was dipped for 5 minutes and stirred in an OFPR 77 series exclusive developer to remove the colored layer 124a vapor deposited on the pattern together with the resist pattern, whereby a blue color stripe filter was prepared (see FIG. 12E).

On the other hand, green and red stripe filters were obtained by repeating the steps of FIGS. 12A-12E. First, as the green dye for vapor deposition, lead phthalocyanine was vapor-deposited to a thickness of 5000 Å to form a green layer.

Next, as the red dye for vapor deposition, anthraquinone was vapor-deposited to a thickness of 3000 Å to form a red layer.

Figure 12F:
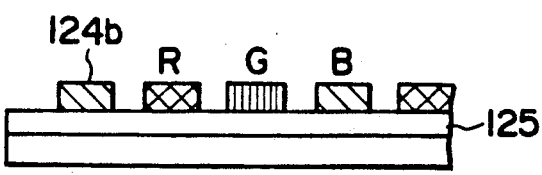

As described above, color filters of B, G and R could be formed as shown in FIG. 12F.

Figure 12G:
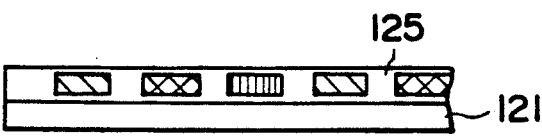

Next, after the color filters containing the heat-fusible resin layer were subjected to hot press at about 150° C. to embed the heat-fusible resin in the gaps between the color filter units, the temperature was returned to room temperature to form a layer binding color filters (see FIG. 12G).

Next, as the protective film 19, a negative resist (ODUR, produced by Tokyo Oka) was formed by coating. At this stage, the color filter substrate is formed on entirely the same plane.

Next, as shown in FIG. 5, ITO film was formed according to the sputtering method to a thickness of 500 Å to form transparent electrode 15. The electrode was coated with a polyimide forming solution ("PIQ" produced by Hitachi Kasei Kogyo) by a spinner rotating at 3000 rpm, followed by heating at 150° C. for 30 minutes to form a polyimide coating of 2000 Å as the alignment control film 17. Then, rubbing treatment was applied on the polyimide coating surface.

The color filter substrate thus formed and confronting substrate 13 were adhered together to be assembled into a cell, and a ferroelectric liquid crystal was injected therein and sealed to obtain a liquid crystal device. When the liquid crystal device was observed by a polarizing microscope of crossed Nicols, it was confirmed that no orientation defect was formed in the internal liquid crystal molecules.

EXAMPLE 6

FIGS. 13A-13G are the diagrams of the steps showing the second step including the color filter layers of the three colors of R, G and B and the heat-fusible resin layer.

First, on #7059 glass substrate 131 produced by Corning was formed a colored resin layer 132 by coating of a blue coated resin material capable of obtaining desired spectral characteristics [the blue colored resin material being a photosensitive colored resin material prepared by dispersing Heliogen Blue L7080 (trade name, produced by BASF Co., C.I. No. 74160) in PA-1000C (trade name, produced by Ube Kosan K.K., polymer content=10%, solvent: N-methyl pyrrolidone, pigment:polymer=1:2)] according to spinner coating to a film thickness of 1.5 μm (see FIG. 13A).

Next, said colored resin layer 132, after prebaked at 80° C. for 30 minutes, was subjected to exposure by use of a high pressure mercury lamp through a photomask 133 corresponding to the pattern shape to be formed (see FIG. 13).

Figure 13A:
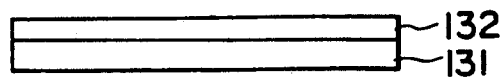
Figure 13B:
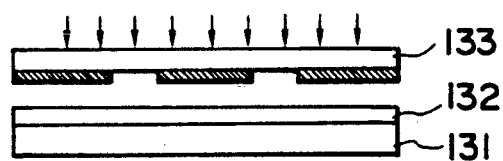
Figure 13C:
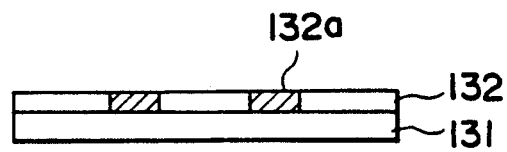
Figure 13D:
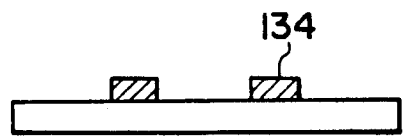
Figure 13E:
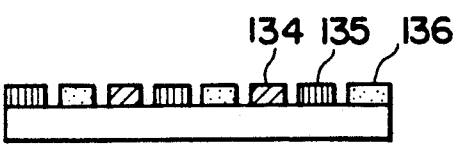

After exposure, as shown in FIG. 13C, the layer 132 was developed by use of supersonic with an exclusive developer comprising N-methyl-2-pyrrolidone as the main component) which dissolved only the unexposed portion of the colored resin layer 132 having the photocured portion 132a, and then the layer 132 was treated with an exclusive rinse solution (e.g. a rinse solution comprising isopropyl alcohol as the main component), followed by post-baking at 150° C. for 30 minutes, to form a blue pattern colored resin layer 134 having a pattern shape (see FIG. 13D).

Subsequently, on the glass substrate having a blue colored pattern formed thereon, a green pattern colored resin layer 135 was formed at the predetermined position on the substrate in the same manner as described above except for using as the second color a green colored resin material [photosensitive colored resin material prepared by dispersing Lionol Green 6YK (trade name, produced by Toyo Ink, C.I. No. 74265) in PA-1000 C (trade name, produced by Ube Kosan K.K., polymer content=10%, solvent: N-methyl-2-pyrrolidone, pigment:polymer=1:2)].

Further, on the substrate having thus formed blue and green patterns thereon, a red pattern colored resin layer 136 was formed at the predetermined position on the substrate in the same manner as described above except for using as the third color a red colored resin material [photosensitive colored resin material prepared by dispersing Irgazin Red BPT (trade name, produced by Ciba-Geigy Co., C.I. No. 71127) in PA-1000 (trade name, produced by Ube Kosan K.K., polymer content=10%, solvent: N-methyl-2-pyrrolidone, pigment:polymer=1:2), thus obtaining a colored pattern of the three color stripes of R (red), G (green) and B (blue) (see FIG. 13E)].

Figure 13F:
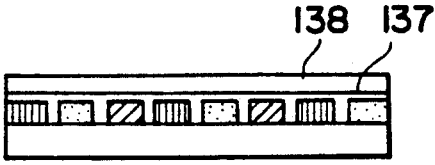

Next, the color filter obtained was coated with a methyl acetate solution of an ethylene-vinyl acetate copolymer resin at a layer thickness of 1.5 μm by use of a spinner, and the coated product was subjected to hot press at about 150° C. to embed the heat-fusible resin 137 in the gaps between the color filter units, followed by cooling to normal temperature to form a layer binding color filters (see FIG. 13F).

On the color filter pattern thus obtained, as the protective film or flattening film 138, a film of the same transparent resin material as used for the colored resin material [PA-1000 C (trade name, produced by Ube Kosan K.K., polymer content=10%, solvent: N-methyl-2-pyrrolidone)] was formed by the spinner coating method to a film thickness of about 0.5 μm (see FIG. 13F)].

As described above, a color filter substrate made on the same plane could be formed.

Next, as shown in FIG. 5, ITO film was formed according to the sputtering method to a thickness of 500 Å to form transparent electrode 15. The electrode was coated with a polyimide forming solution ("PIQ" produced by Hitachi Kasei Kogyo) by a spinner rotating at 3000 rpm, followed by heating at 150° C. for 30 minutes to form a polyimide coating of 2000 Å as the alignment control film 17. Then, rubbing treatment was applied on the polyimide coating surface.

The color filter substrate thus formed and confronting substrates 13 were adhered together to be assembled into a cell, and a ferroelectric liquid crystal was injected therein and sealed to obtain a liquid crystal device. When the liquid crystal device was observed by a polarizing microscope of crossed Nicols, it was confirmed that no orientation defect was formed in the internal liquid crystal molecules.

As described above, according to the present invention, since the difference in film thickness between the color filter layers and the gaps between the color filter units are filled with a heat-fusible resin, great stepped difference does not occur, and further by providing a protective or flattening film as described, it becomes also possible to remove fine stepped difference occurring between the respective units of color filters, whereby generation of alignment defect could be avoided to provide a ferroelectric liquid crystal device capable of exhibiting fully the characteristics of a ferroelectric liquid crystal.

Next, a cell was prepared in the same manner as described above except for omitting use of the heat-fusible resin film. As the result, alignment defects could be confirmed at the color filter stepped difference portions.

EXAMPLE 7

FIGS. 14A–14G are the diagrams of the steps showing the formation steps of the color units of the three colors of R, G and B.

First, on #7059 glass substrate 141 was formed a colored resin layer 142 by coating of a blue colored resin material capable of obtaining desired spectral characteristics [the blue colored resin material being a photosensitive colored resin material prepared by dispersing Heliogen Blue L7080 (trade name, produced by BASF Co., C.I. No. 74160) in PA-1000C (trade name, produced by Ube Kosan K.K., polymer content=10%, solvent: N-methyl pyrrolidone, pigment:polymer=1:2)] according to spinner coating to a film thickness of d $\mu$m (see FIG. 14A).

Figure 14A:
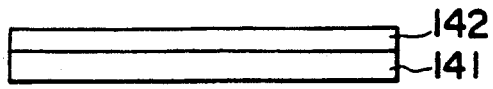
Figure 14B:
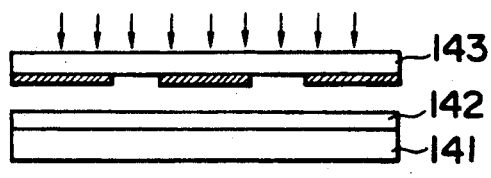

Next, colored resin layer 142, after prebaked at 70° C. for 30 minutes, was subjected to exposure by use of a high pressure mercury lamp through a photomask 143 corresponding to the pattern shape to be formed (see FIG. 14B).

Figure 14C:
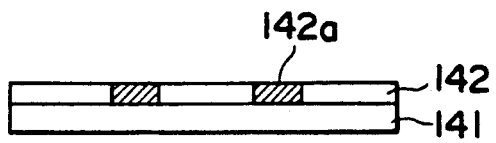
Figure 14D:
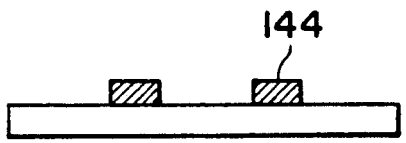
Figure 14E:
Figure 14F:
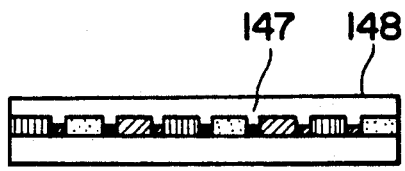

After exposure, as shown in FIG. 14C, the layer 142 was developed by use of supersonic with an exclusive developer (the developer comprising N-methyl-2-pyrrolidone as the main component) which dissolved only the unexposed portion of the colored resin layer 142 having the photocured portion 142a, and then the layer 142 was treated with an exclusive rinse solution (e.g. a rinse solution comprising isopropyl alcohol as the main component), followed by post-baking at 200° C. for 30 minutes, to form a blue pattern colored resin layer 144 having a pattern shape (see FIG. 14D).

Subsequently, on the glass substrate having a blue colored pattern formed thereon, a green pattern colored resin layer 145 was formed with a unit interval from the blue colored pattern as a measured value l ($\mu$m) on the substrate in the same manner as described above by using as the second color a green colored resin material [photosensitive colored resin material prepared by dispersing Lionol Green 6YK (trade name, produced by Toyo Ink, C.I. No. 74265) in PA-1000 C (trade name, produced by Ube Kosan K.K., polymer content=10%, solvent: N-methyl-2-pyrrolidone, pigment:polymer=1:2) ].

Further, on the substrate having thus formed blue and green patterns thereon, a red pattern colored resin layer 136 was formed with a unit interval from the blue and the green colored patterns as a measured value l ($\mu$m) at the predetermined position on the substrate in the same manner as described above except for using as the third color a red colored resin material [photosensitive colored resin material prepared by dispersing Irgazin Red BPT (trade name, produced by Ciba-Geigy Co., C.T. No. 71127) in PA-1000 (trade name, produced by Ube Kosan K.K., polymer content=10%, solvent: N-methyl-2-pyrrolidone, pigment:polymer=1:2)], thus obtaining a colored pattern of the three color stripes of R (red), G (green) and B (blue) (see FIG. 14E).

Next, on the glass substrate having the colored pattern of the three colors formed thereon, as the light intercepting layer, a light intercepting layer 147 with a light intercepting pattern was formed in conformity with the gap between the respective units according to a procedure similarly to that as described above by use of a black colored resin material [photosensitive colored resin material prepared by dispersing Carbon Black (C.I. No. 77266) in PA-1000 C (polymer content=10%, pigment:polymer=1:4)].

On the color filter pattern thus obtained, as the protective film or flattening film 148, a film of the same transparent resin material as used for the colored resin material [PA-1000 C (trade name, produced by Ube Kosan K.K., polymer content=10%, solvent: N-methyl-2-pyrrolidone)] was formed by the spinner coating method to a film thickness of about 0.5 $\mu$m (see FIG. 14F).

Next, as shown in FIG. 6, ITO film was formed according to the sputtering method to a thickness of 500 Å to form transparent electrode 15. The electrode was coated with a polyimide forming solution ("PIQ" produced by Hitachi Kasei Kogyo) by a spinner rotating at 3000 rpm, followed by heating at 150° C. for 30 minutes to form a polyimide coating of 2000 Å as the alignment control film 17. Then, rubbing treatment was applied on the polyimide coating surface.

The color filter substrate thus formed and confronting substrate 13 were adhered together to be assembled into a cell, and "CS-1014" (trade name) produced by Chisso K.K. which is a ferroelectric liquid crystal was injected therein and sealed to obtain a liquid crystal device. When the liquid crystal device was observed by a polarizing microscope of crossed Nicols, and the extent of alignment defect of the internal liquid crystal molecules was evaluated.

In the above method, the film thickness d ($\mu$m) of color filter and the distance l ($\mu$m) between the respective units of color filters were varied for evaluation of alignment defects to obtain the results shown in Table 1.

TABLE 1

|  | Test 1 | Test 2 | Test 3 | Test 4 | Test 5 |
|---|---|---|---|---|---|
| d ($\mu$m) | 0.9 | 1.0 | 1.5 | 1.5 | 2.1 |
| l ($\mu$m) | 5.2 | 4.7 | 5.0 | 9.0 | 11.0 |
| l/d | 5.8 | 4.7 | 3.3 | 6.0 | 5.2 |
| Alignment defect state | △ | ○ | ○ | X | △ |

Note)
(1) The values of d and l are those measured.
(2) Evaluation of alignent defect state: The symbol ○ means the state free substantially from any problem. The symbol △ means the state that slight defects are recognized. The symbol X means the state that remarkable defects are recognized.

As described above, according to the present invention, by setting the intervals between the respective units of the color filters on the substrate at 5-fold or less of the film thickness, it has become possible to reduce remarkably the alignment defect caused by the stepped difference between the units.

Also, by providing a light intercepting layer, a protective or flattening layer on the color filter as desired, it has become possible to alleviate sufficiently the stepped difference occurring between the respective units of the color filter, whereby generation of alignment defect could be avoided to provide a ferroelectric liquid crystal device capable of exhibiting fully the characteristics of a ferroelectric liquid crystal.

We claim:

1. A liquid crystal device, comprising:
   a pair of transparent electrodes having a plurality of confronting portions formed therebetween;
   a pair of substrates, one of said pair of substrates supporting each of said pair of transparent electrodes;
   a group of color filters comprising a plurality of non-overlapping color filters arranged on the inner side of at least one of said pair of substrates, said plurality of color filters being arranged at positions corresponding to each of said plurality of confronting portions, such that the relationship $$0 \leq 1/d \leq 5$$

is satisfied wherein $l$ ($\mu$m) is the interval between the color filters of adjacent confronting portions and $d(\mu m)$ is the film thickness of said color filters; and
   a chiral smectic liquid crystal provided between said pair of substrates, wherein the formation of the spiral structure of said chiral smectic liquid crystal is suppressed.

2. A liquid crystal device according to claim 1, wherein said color filters are arranged between one of said pair of substrates and said one of said pair of transparent electrodes formed on said one of said pair of substrates.

3. A liquid crystal device according to claim 2, wherein a protective film is arranged between said color filters and said one of said pair of transparent electrodes.

4. A liquid crystal device according to claim 1, wherein said color filters are formed according to the photolithographic step of a color resin comprising a colorant material dispersed in a low-temperature-curing polyamino type resin having a photosensitive group in the molecule.

5. A liquid crystal device according to claim 4, wherein said polyamino type resin is an aromatic polyamide resin or polyimide resin having photosensitive group in the molecule and is capable of giving a cured film at 200° C. or lower.

6. A liquid crystal device according to claim 1, further comprising an alignment control film.

7. A liquid crystal device according to claim 1, wherein a monoaxial alignment treatment axis is imparted to said alignment control film.

8. A liquid crystal device according to claim 7, wherein said monoaxial alignment treatment axis is a rubbing treated axis.

9. A liquid crystal device according to claim 1, wherein said color filters have a film thickness in the range of from 0.5 $\mu$m to 5 $\mu$m.

10. A liquid crystal device according to claim 1, wherein said color filters exhibit blue, green or red color per each color filter.

* * * * *

UNITED STATES PATENT AND TRADEMARK OFFICE
CERTIFICATE OF CORRECTION

PATENT NO. : 5,101,289
DATED : March 31, 1992
INVENTOR(S) : HIDEAKI TAKAO, ET AL.

It is certified that error appears in the above-identified patent and that said Letters Patent is hereby corrected as shown below:

COLUMN 2

Line 19, "a(µm)" should read --$\alpha$(µm)--.

COLUMN 4

Line 50, "SiO$_2$oblique" should read --SiO$_2$ oblique--.

COLUMN 5

Line 12, "(1/20)·d" should read --(1/20)·d$_0$--.

COLUMN 8

Line 18, "can" should read --can be--.
Line 45, "film 32" should read --film 32 by--.

COLUMN 21

Line 66, "FIG. 13)." should read --FIG. 13B).--

COLUMN 22

Line 28, "PA-1000" should read --PA-1000C--.

COLUMN 24

Line 1, "C.T." should read --C.I.--.

UNITED STATES PATENT AND TRADEMARK OFFICE
CERTIFICATE OF CORRECTION

PATENT NO. : 5,101,289
DATED : March 31, 1992
INVENTOR(S) : HIDEAKI TAKAO, ET AL.

It is certified that error appears in the above-identified patent and that said Letters Patent is hereby corrected as shown below:

COLUMN 26

Line 20, "claim 7," should read --claim 6,--.

Signed and Sealed this

First Day of March, 1994

Attest:

BRUCE LEHMAN

Attesting Officer

Commissioner of Patents and Trademarks